United States Patent
Rusek, Jr. et al.

[11] Patent Number: 5,869,407
[45] Date of Patent: *Feb. 9, 1999

[54] FIBROUS INSULATION PRODUCT HAVING INORGANIC BINDERS

[75] Inventors: Stanley J. Rusek, Jr., Newark; Albert B. Fisher, Columbus; Carl R. Strauss, Granville, all of Ohio

[73] Assignee: Owens Corning Fiberglas Technology, Inc., Summit, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 769,389

[22] Filed: Dec. 19, 1996

Related U.S. Application Data

[62] Division of Ser. No. 473,644, Jun. 7, 1995, Pat. No. 5,591,505.

[51] Int. Cl.[6] .............................. B32B 5/00; B32B 17/02
[52] U.S. Cl. ........................... 442/140; 442/59; 442/180
[58] Field of Search .................................. 428/69, 76, 74; 442/180, 140; 156/60

[56] References Cited

U.S. PATENT DOCUMENTS

| | | | |
|---|---|---|---|
| 2,769,729 | 11/1956 | Van De Zande | 442/140 |
| 2,935,471 | 5/1960 | Aarons et al. | 442/140 |
| 3,649,406 | 3/1972 | McNish | 156/245 |
| 3,932,161 | 1/1976 | McNish | 65/3 |
| 4,053,674 | 10/1977 | Buck et al. | 428/283 |
| 4,204,907 | 5/1980 | Korklan et al. | 162/135 |
| 4,310,585 | 1/1982 | Shannon | 428/218 |
| 4,332,307 | 6/1982 | Ito | 181/256 |
| 4,332,852 | 6/1982 | Korklan et al. | 428/331 |
| 4,726,974 | 2/1988 | Nowobilski et al. | 428/69 |
| 4,833,025 | 5/1989 | Rossi | 428/357 |
| 5,041,321 | 8/1991 | Bendig | 428/102 |
| 5,330,816 | 7/1994 | Rusek, Jr. | 428/69 |

*Primary Examiner*—Alexander Thomas
*Attorney, Agent, or Firm*—C. Michael Gegenheimer; Curtis B. Brueske

[57] ABSTRACT

A fiber insulation product is provided which includes a fibrous material having a binder dispersed throughout. The binder comprises an inorganic material having thermoplastic properties. Preferably, the binder is a low-melting glass composition or a glass-forming compound such as, for example, boric acid. The insulation product is ideally suited for use in insulation panels having a compressed board encased in a evacuated jacket, high temperature, low smoke, odorless and building insulation applications.

13 Claims, 1 Drawing Sheet

FIBROUS INSULATION PRODUCT HAVING INORGANIC BINDERS

CROSS-REFERENCE TO RELATED APPLICATION

This is a division of U.S. patent application Ser. No. 08/473,644, filed Jun. 7, 1995, now U.S. Pat. No. 5,591,505.

BACKGROUND OF THE INVENTION

This invention relates to fibrous insulation products, and more particularly, to fibrous insulation products having inorganic binders.

Binder materials for fibrous insulation products are well-known. Binder materials hold the individual fibers of a collection of fibers together providing the collection with the integrity to maintain a formed product such as a blanket, mat, bat or panel of insulation material. Binder materials have typically been organic resin materials. Organic resin materials exist in the uncured state as liquids in solution. Thus, they can be easily applied to fibrous materials by spraying or other well-known means. Resin materials can be cured to crosslink the resin and provide strong bonds with the fibrous material. In addition, resin materials can provide thermoplastic properties so that the insulation product may be reheated to allow shaping and processing of the insulation material. These advantages allow cost effective manufacture of fibrous insulation products.

However, organic binder materials are not suitable for all insulation applications. Certain insulation applications require the insulating material to be maintained in an evacuated enclosure. U.S. Pat. No. 5,330,816 to Rusek et al discloses super insulation panels comprising compressed insulating boards in an evacuated jacket. Organic binder materials generally contain volatile organic compounds or VOC's which can be given off slowly over time. Such volatile organic compounds will degrade the level of vacuum in the enclosure and reduce the overall performance of the insulation. Further, certain insulation applications require exposure to high temperatures which can degrade or breakdown an organic binder material. Lastly, organic binder materials may potentially release odors which may be undesirable in some applications.

Accordingly, inorganic binder materials are desired for many applications. Inorganic binder materials have heretofore been known. U.S. Pat. No. 4,833,025 to Rossi discloses inorganic binder materials of silicates, kaolin clay, alumina, zirconia or aluminum phosphate. However, silicate materials, degrade glass fibers on which they are applied. The alkalinity of the silicate compounds causes a breakdown of the individual glass fibers leading to a failure in the insulation product. The remaining compounds, including aluminum phosphate, provide thermosetting properties. That is, these compounds, once solidified, cannot be resoftened to allow additional processing of the insulation material. As a result, they can not be compressed after solidification of the binder for packaging or installation in a compacted state. Thus, the insulation material must be shaped or compressed before solidification. This significantly increases the costs associated with production of insulation having thermoset inorganic binders.

Accordingly, the need remains for an insulation product having an inorganic binder material with thermoplastic properties, which will not degrade at high temperatures, and which will not give off volatile compounds.

SUMMARY OF THE INVENTION

These needs are met by the present invention wherein an insulation product having an inorganic thermoplastic binder is provided. The inorganic binder has thermoplastic properties so that the binder can be softened after an initial solidification for further processing of the insulation material. The insulation product of the present invention is particularly useful for insulation application involving high density insulation in evacuated atmospheres, as well as high temperature, building, low smoke or odor free insulation applications because it does not degrade at high temperatures or give off volatile compounds.

In accordance with a first aspect of the present invention, a fiber insulation product is provided. The fiber insulation product comprises a collection of fibrous material having a binder dispersed throughout the fibrous material. The binder comprises inorganic material having thermoplastic properties. Preferably, the fibrous material is glass fibers. Preferably, the inorganic binder is a low-melting glass composition or a glass-forming material which is compatible with the glass fibers.

The binder may be a glass-forming phosphate compound or a glass-forming boron compound. The glass-forming boron compound is preferably selected from the group consisting of boric acid, borax, perborates, metaborates, borohydrides, borates and combinations thereof. Most preferably, the binder is boric acid. The binder may also be a glass-forming phosphate compound selected from the group consisting of cyclic phosphates or polymeric phosphates, or a low melting glass composition selected from the group consisting of solder glasses, glass frits and glass enamels. Preferably, the binder comprises from about 0.1% to about 7% by weight of the insulation product. More preferably, the binder comprises from about 0.5% to about 3% by weight of the insulation product.

In accordance with another aspect of the present invention, an insulation panel is provided. The insulation panel comprises a sealed evacuated outer jacket encasing a compressed fibrous mat. The compressed fibrous mat is a collection of a fibrous material having a binder dispersed throughout. The binder comprises an inorganic material having thermoplastic properties. The fibrous material preferably is glass fibers. Preferably, the inorganic binder is a low-melting glass composition or a glass-forming material which is compatible with the glass fibers as described above.

Accordingly, it is an object of the present invention to provide an insulation product having an inorganic binder material which is compatible with the glass fibers and has thermoplastic properties. It is a further object of the present invention to provide an insulation product comprising a collection of fibers and binder encased in an evacuated outer jacket. It is still another object of the present invention to provide an insulation product of glass fibers having a boric acid binder dispersed through the glass fibers. Other objects, features and advantages of the present invention will be apparent from the following description, the accompanying drawing and the appended claims.

DETAILED DESCRIPTION OF THE PREFERRED EMBODIMENTS

Figure 1:
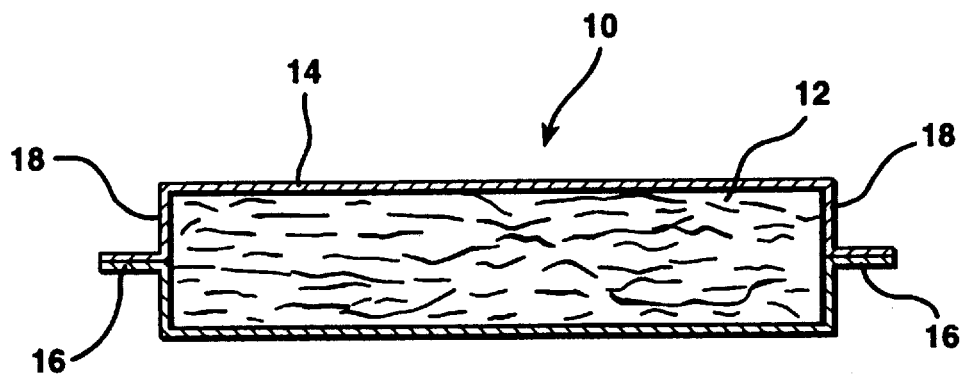
FIG. 1 is a cross-sectional side-view of an insulation panel according to the present invention.

The present invention will be described in terms of an insulation product. One of ordinary skill in the art will recognize that the concepts of the present invention will apply to any insulation product such as insulation mats, blankets, batts or loose-fill for attic or wall insulation as well as compressed insulation boards or panels, etc. It is further to be understood that while glass fibers are preferred, other mineral fibers, such as rock, slag or basalt fibers as well as polymer fibers such as aramid fibers can be employed in the present invention.

The present invention comprises a collection of a fibrous material having a binder material dispersed throughout the fibrous material. The fibrous material is preferably glass fibers. Preferably, the glass fibers have a diameter of between 1 and 25 microns, and most preferably, between 3 and 12 microns. Preferably, the fibers are made from a rotary fiberizing process as is well known in the art and have a generally uniform fiber diameter. However, continuous lengths of fibers produced from a fiberizing process employing a bushing may also be employed in the present invention.

The binder material of the present invention comprises an inorganic material which has thermoplastic properties. That is, the inorganic material is a material which will soften and become malleable upon reheating. In addition, to be a suitable binder material, the inorganic material is one which is compatible with the glass fibers upon which it is applied. In other words, an inorganic thermoplastic binder will not chemically attack or degrade the glass fibers. Certain inorganic materials, such as silicate compounds, attack the glass fibers, leaching components from the glass. This chemical attack results in the breakdown of the glass fibers causing them to break or crumble. Thus, in order to be a suitable inorganic binder material, the inorganic material must be compatible with the fibrous material upon which it is applied.

In addition, inorganic materials having thermoplastic properties suitable for use as binders according to the present invention include glass-forming inorganic materials. Glass-forming inorganic materials are those materials which can be applied to a collection of fibrous material, then heated to a temperature at which the material forms a glass compound. Thus, a coating of glass is formed on the collection of fibers which acts as a binder.

The step of heating a binder material is traditionally referred to as curing of the binder material. However, inorganic binder materials having thermoplastic properties do not undergo a traditional cure in that the binder does not undergo crosslinking as in organic binder materials. Rather, inorganic binder materials having thermoplastic properties simply solidify as the material cools. Thus, the solidification of inorganic binders of the present invention is not rate dependent as in a chemical crosslinking process. The cure in the present invention is determined by the relative rates of melting and solidification, as well as the loss of bound water, if present, all of which will vary with the type of binder material and the rate of transfer through the glass wool pack. Preferably, the cure of inorganic binders of the present invention will range from about 1 to about 15 minutes.

The surface energy of freshly made glass fibers is high. Thus, inorganic binders in an aqueous solution will readily wet the fiber surface with little difficulty. Further, since the inorganic binder is thermoplastic and has a low initial molecular weight, viscosity growth during drying and cure is not a concern as with some thermosetting high molecular weight organic binders. Accordingly, there will be no viscosity barrier to adequate formation of bonds between fibers. While not wishing to be bound by any one theory of operation, it is believed the binders of the present invention function by creating binder rich regions on the surface of the glass fiber. When another fiber comes into contact with the binder rich region and heat is applied, the binder melts to fuse the two fibers locally. Upon cooling and solidification, a bond is formed.

Figure 2:
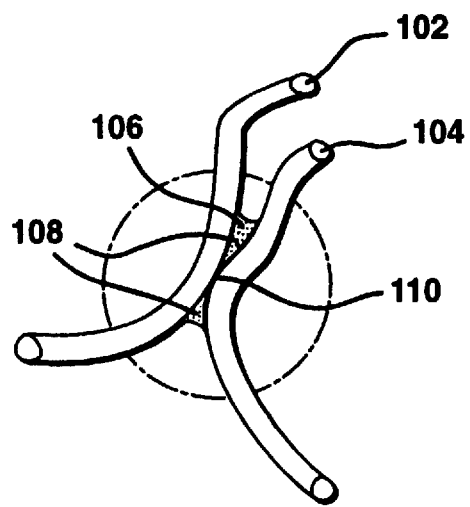
FIG. 2 is a representation of a bond between two adjacent fibers.

There can be chemical interactions between the glass fiber surfaces and the inorganic binder. Some inorganic binders can act as powerful glass fluxing agents. For example, boric acid binder when heated on glass fibers can be converted to a boron oxide ($B_2O_3$) glass which can combine with the glass fiber to form a new intermediate glass at the fiber/binder interface. This is desirable and the degree of bonding stretch desired is controllable by the parameters which include 1) time, 2) temperature, 3) binder amount and type, and 4) glass chemistry. These types of bonds were found to be reversible in a thermoplastic sense without destroying the glass fiber networks. Referring to FIG. 2, there is seen two adjacent glass fibers 102 and 104. Inorganic binder material 106 forms a bond 108 at an intersection 110 of the fibers 102 and 104.

Suitable inorganic materials with thermoplastic properties which can be employed as binder materials according to the present invention include low-melting glass compositions and glass-forming materials. Low-melting glass compositions are glass compositions which melt at lower temperatures. For the purposes of the present invention, a low-melting glass composition is one which melts at about 1000° F. (538° C.) or less. Examples of low melting glass compositions include those having high boron, high lead or high phosphate contents. Suitable low-melting glass compositions include compositions in the category of solder glass, glass frits or glass enamels. Solder glasses, glass frits and glass enamels are all well-known classes of glass compositions and are commercially available from a number of suppliers.

Additional glass-forming inorganic materials suitable for use in the present invention include glass-forming phosphate and glass-forming boron compounds. Glass-forming boron compounds include boric acid, borax, including anhydrous borax, borax.$5H_2O$ and borax.$10H_2O$, perborate compounds such as sodium perborate, metaborate compounds such as metaborate tetrahydrate, borohydrides, borates including anhydrous, hydrated, and compounds per Dana's System of Mineralogy, and combinations of the above. Glass-forming phosphate compounds include cyclic phosphates such as sodium hexametaphosphate, polymeric phosphates such as ammonium polyphosphate, and combinations thereof.

The preferred binder material for the present invention is boric acid. Boric acid is a glass-forming material which can be converted to a glass at a relatively low temperature of about 572° F. (300° C.) and can cure or solidify in from about 3 minutes to about 15 minutes depending upon the thickness of the product. For example, a quantity of glass fiber insulation coated with 2.0% by weight boric acid and pressed to a 0.5 inch inch thickness at 14 pounds per cubic inch in a pressure press at 960° F. requires 5 minutes to cure or solidify.

However, while boric acid is the preferred binder material of the present invention, the manufacturing process must be tailored to accommodate the hygroscopic nature of the formed borate glass binder. That is, the boric acid forms a borate glass upon heating. Borate glass is hygroscopic in that it absorbs water from the atmosphere. After formation of the insulation product, the mechanical properties of the product will remain unchanged for up to 48 hours at a relative humidity of 90% and a temperature of 75° F. (24° C.). After this period of time, the mechanical properties may begin to degrade due to the absorbed moisture. Thus, if the manufacturing process will require exposure of an insulation product having a boric acid binder to high humidity and high temperature conditions for longer than 24 to 48 hours, it may be necessary to store the insulation product in either an air conditioned, humidity-controlled space or in a heated environment such as at about 120° F. (49° C.).

The inorganic binders of the present invention are preferably applied to the fibers as an aqueous solution. Application as a solution allows a higher throughput of insulation in commercial applications. The inorganic binder solution can be applied by spray processes well-known in the art. Preferably, the inorganic binder is applied by spraying through liquid pressure spray tips or air atomized spray tips. Liquid pressure spray tips generate less pollution in the form of drops in the atmosphere which must be recovered and removed. However, due to a larger droplet size, for example from 500 to 600 microns, glass coverage is from about 5 to about 10% poorer than with air atomized spray tips. Air atomized spray tips generate better glass coverage due to a smaller droplet size of about 80 to about 100 microns, but generate more pollution than liquid pressure spray tips. Preferably, the inorganic binders of the present invention are sprayed to provide about 0.1% to about 7% by weight binder based on the weight of the glass in the insulation product. More preferably, the inorganic binder is sprayed to a level of from about 0.5% to about 3% by weight based on the weight of the glass in the insulation product.

The insulation product of the present invention is ideally suited for use in high temperature, low smoke, odorless, evacuated atmosphere and building insulation applications. A preferred use of the insulated product of the present invention is in evacuated atmospheres such as insulation panels. Referring now to FIG. 1, there is seen an insulation panel 10 having a glass fiber insulation board 12 and an envelope 14. Preferably, the envelope is produced in two halves, welded or otherwise sealed together at joints 16 and around edges 18 of the envelope 14.

The envelope 14 is preferably made of a thin but strong material in order to provide strength and a good barrier to maintain the vacuum within the panel. The envelope 14 is preferably made from a low conductance metal, which is one that has a combination of thinness and low thermal conductivity to prevent substantial conductance of heat. A suitable material is a stainless steel material having a thickness less than 7 mils (0.178 mm). Most preferably, the low conductance metal is Allegheny Ludlum type 304L stainless steel having a thickness of about 3 mils (0.076 mm). The area of the envelope having the most critical need for a low conductance material is at the edges of the envelope 14. This is because of the tendency of heat to short-circuit the panel 10 by flowing around the edges. It is possible to have the major faces of the envelope of one material or of one thickness of material and the edges of the envelope of a second material having a lower thermal conductivity.

Insulation board 12 can be manufactured from a standard rotary-fiberizing process. A veil of glass fibers can be produced by conventional rotary fiberizing methods. The fibers preferably have a diameter between 1 and 25 microns, and most preferably a diameter between 3 and 12 microns. Preferably, the fibers have generally uniform diameters. The inorganic binder of the present invention is then applied by a spray application by means of the spray apparatus described above. The coated fibers are then collected by conventional and well-known means such as a conveyor and passed through a conventional oven at temperatures up to about 1000° F. (538° C.) to cause the binder to bond the fibers together and produce a bindered insulation product.

The thermoplastic properties of the binder material then allow an insulation board to be formed by heating the insulation product once again by conventional means, compressing the heated product by conventional means such as calendering or rolling, and cooling the compressed product by conventional means such as cooling rolls and cooling air to form insulation board 12. Application of heat to the fibers in the non-compacted state allows quicker and easier formation of a mat or batt by flowing heated air through the non-compacted insulation product. Alternatively, insulation board 12 may be produced by compacting the bindered insulation product before cure of the binder in a heated pressure press as described in U.S. Pat. No. 5,330,816, the disclosure of which is hereby incorporated by reference. The density of the produced boards in pounds per cubic foot (pcf) is preferably within the range of from about 6 pcf (96 kg/m$^3$) to about 28 pcf (448 kg/m$^3$).

Thus, the thermoplastic properties of the binder material, wherein the binder can be re-heated and made malleable allows continuous in-line forming of insulation boards. Thermosetting inorganic binder materials as disclosed in the prior art cannot be reheated and made malleable. Thus, insulation coated with a thermosetting inorganic binder as in the prior art must be held under compression in a pressure press during the entire cure process. This prevents continuous in-line production. However, the thermoplastic properties of the present invention allow a cure of the material in the non-compacted state followed by reheating for compaction under rolls or other means. Thus, a continuous in-line process may be used.

Returning to FIG. 1, after encapsulation of board 12 in envelope 14, the panel 10 can be evacuated, preferably to an absolute internal pressure of less than 20 torr, and most preferably to an absolute internal pressure within the range of from about $10^{-5}$ torr to about $10^{-1}$ torr. Numerous evaluation techniques are known in the art. Most preferably, the absolute internal pressure is about $10^{-3}$ torr. The joints at the edges of the envelope are preferably sealed by welding. The resulting panel exhibits a significant improvement over the prior art panels typically used in appliances such as refrigerators by providing higher R-value. The board of the present invention provides adequate structural strength to resist the pressure applied on the board by the differential pressure between the partial vacuum and the outside atmospheric pressure.

A panel having a 21 in. square (53 cm×53 cm), ¾ inch board, when evacuated to $10^{-3}$ torr, and encapsulated by a stainless steel foil jacket (3 mil foil, 0.076 mm) may provide an R-value of 20, which is an equivalent value of 27 R per inch as measured using ASTM test C-518.

Having described the invention in detail and by reference to the preferred embodiment thereof, it will be apparent that modifications and variations are possible without departing from the scope of the invention which is defined in the appended claims.

We claim:

1. A fiber insulation product consisting essentially of:
   a collection of fibrous material bound together by a binder dispersed throughout said fibrous material, said binder consisting essentially of an inorganic binder having thermoplastic properties.

2. The insulation product as claimed in claim 1 wherein said fibrous material comprises glass fibers.

3. The insulation product as claimed in claim 1 wherein said binder comprises a low-melting glass composition or an inorganic glass-forming material.

4. The insulation product as claimed in claim 3 wherein said binder comprises a glass forming phosphate compound or a glass forming boron compound.

5. The insulation product as claimed in claim 4 wherein said binder comprises a glass-forming boron compound selected from the group consisting of boric acid, borax, perborates, metaborates, borohydrides, borates and combinations thereof.

6. The insulation product as claimed in claim 5 wherein said binder is boric acid.

7. The insulation product as claimed in claim 1 wherein said binder comprises from about 0.1% to about 7% by weight of said fibrous material.

8. The insulation product as claimed in claim 7 wherein said binder comprises from about 0.5% to about 3% by weight of said fibrous material.

9. A fiber insulation product consisting essentially of:
a collection of glass fibers having a boric acid binder dispersed throughout said glass fibers.

10. The insulation product as claimed in claim 9 wherein said binder comprises from about 0.1% to about 7% by weight of said glass fibers.

11. The insulation product as claimed in claim 10 wherein said binder comprises from about 0.5% to about 3% by weight of said glass fibers.

12. A fiber insulation product consisting essentially of:
a collection of glass fibers bound together by a binder dispersed throughout said fibrous material, said binder consisting essentially of an inorganic binder having thermoplastic properties.

13. A fiber insulation product comprising:
a collection of glass fibers having a binder consisting essentially of boric acid dispersed throughout said glass fibers.

* * * * *